United States Patent [19]

Endo

[11] 4,424,737

[45] Jan. 10, 1984

[54] STROKE CUSHIONING APPARATUS FOR HYDRAULIC CYLINDERS

[75] Inventor: Hisashi Endo, Kawasaki, Japan

[73] Assignee: Kabushiki Kaisha Komatsu Seisakusho, Tokyo, Japan

[21] Appl. No.: 245,963

[22] Filed: Mar. 20, 1981

[30] Foreign Application Priority Data

Mar. 26, 1980 [JP] Japan .............................. 55-38721[U]
Mar. 26, 1980 [JP] Japan .............................. 55-38722[U]

[51] Int. Cl.³ ............................................. F15B 15/22
[52] U.S. Cl. ....................................... 91/396; 285/276
[58] Field of Search ................... 91/396, 395, 394, 26, 91/25; 285/276

[56] References Cited

U.S. PATENT DOCUMENTS 2,696,264 12/1954 Colmerouer et al. ............... 285/276
2,853,974 9/1958 Hewitt ..................... 91/26
3,317,220 5/1967 Bruning ................. 285/276
3,447,423 6/1969 Henry ..................... 91/395
3,704,650 12/1972 Berg ......................: 91/396
4,296,675 10/1981 Gies ....................... 91/26

*Primary Examiner*—Paul E. Maslousky
*Attorney, Agent, or Firm*—Armstrong, Nikaido, Marmelstein & Kubovcik

[57] ABSTRACT

A stroke cushioning apparatus for a hydraulic cylinder provided at rod side stroke end and/or head side stroke end. The rod side stroke end cushioning apparatus comprises a sleeve mounted on a piston rod and a cushion ring mounted on the inner face of a housing defining a passage which accommodates the sleeve when a piston assembly is moved to its rod side stroke end. The cushion ring is allowed to move slightly in an axial direction. When the piston assembly is moved towards its rod side stroke end and the sleeve enters into the passage, flow of fluid is restricted between the cushion ring and the sleeve thus effecting a cushioning action to the piston assembly.

The head side stroke end cushioning apparatus comprises a plunger mounted to the piston rod and wall of a passage formed at the head end of the cylinder. The plunger is mounted to the piston rod by means of a plurality of balls with allowing slight movements of the plunger both axially and radially. When the piston assembly is moved towards its head side stroke end and the plunger enters into the passage, flow of fluid is restricted between the plunger and the wall of the passage thus effecting a cushioning action to the piston assembly.

3 Claims, 2 Drawing Figures

STROKE CUSHIONING APPARATUS FOR HYDRAULIC CYLINDERS

BACKGROUND OF THE INVENTION

This invention relates to a stroke cushioning means for a hydraulic cylinder adapted to slow down and stop a piston at the stroke ends thereof.

There has heretofore been employed a rod-side stroke cushioning means wherein a sleeve is fitted from outside to a portion of the piston rod near the piston and a cushion ring is fitted on the side of one end of the cylinder to restrict the fluid flow between the cushion ring and the sleeve. In the above-mentioned prior art cushion ring, since it is difficult to align the center line of the cushion ring through which the sleeve is moved forwards and backwards with that of the hydraulic cylinder, it is necessary to fit the cushion ring inside the cylinder in such a manner that it can be moved to some degree and then secure the cushion ring by means of a snap ring. Such snap ring has been disadvantageous in that since it has a notch formed in part of the circumferential portion thereof, noise tends to generate in the notch when part of the fluid under pressure confined therein is discharged into the passage thereby damaging the snap ring quickly.

Whilst, there has heretofore been employed a cylinder-head end stroke cushioning means wherein a plunger is fitted to the leading end of a piston rod to obtain a cushioning effect. This type of plunger has, however, been disadvantageous in that because it is difficult to align the center line of the passage in which the plunger is moved forwards and backwards with that of the cylinder, it is necessary to fit the plunger to the piston rod so that the plunger can be moved relative to the piston rod to some degree thereby complicating the structure of the component parts.

SUMMARY OF THE INVENTION

It is therefore an object of the present invention to provide a stroke cushioning apparatus for a hydraulic cylinder which can overcome the above noted problems.

Another object of the present invention is to provide a rod end stroke cushioning apparatus which is simple in construction yet can provide a reliable cushioing function.

A further object of the present invention is to provide a head end stroke cushioning apparatus which is also simple in construction yet can provide a reliable cushioning function.

In accordance with an aspect of the present invention, there is provided a stroke cushioning apparatus for a hydraulic cylinder, comprising: a housing; a piston assembly slidably mounted within said housing, said piston assembly including a rod and a piston mounted on said rod and defining at least one fluid chamber in said housing; a sleeve fixedly mounted on said rod; an axial passage communicating with the fluid chamber and outside of said housing, said axial passage being adapted to accommodate said sleeve therein when said piston assembly is moved to its rod side stroke end; a land formed in said housing within said axial bore; a stopper plate fixedly mounted to said housing; and a cushion ring mounted to said housing between said land and said stopper plate, said cushion ring being allowed to move slightly in an axial direction and the inner diameter of which is made slightly larger than the outer diameter of said sleeve whereby flow of fluid is restricted between said sleeve and said cushion ring when said piston assembly is moved to its rod side stroke end thereby effecting cushioning action to the movement of said piston assembly.

According to another aspect of the present invention, there is provided a stroke cushioning apparatus for a hydraulic cylinder, comprising: a housing; a piston assembly slidably mounted within said housing, said piston assembly including a rod and a piston mounted on said rod and defining at least one fluid chamber in said housing; a plunger mounted to said rod; means for mounting said plunger to said rod with allowing slight movements of said plunger both axially and radially; and an axial passage communicating with the fluid chamber and outside of said housing, said axial passage being adapted to accommodate said plunger therein when said piston assembly is moved to its head side stroke end, the diameter of said passage being made slightly larger than that of said plunger whereby flow of fluid is restricted between said plunger and wall of said passage when said piston assembly is moved to its head side stroke end thereby effecting cushioning action to the movement of said piston assembly.

The above and other objects, features and advantages of the present invention will be readily apparent from the following description taken in conjunction with the accompanying drawings.

DESCRIPTION OF THE PREFERRED EMBODIMENT

Figure 1:
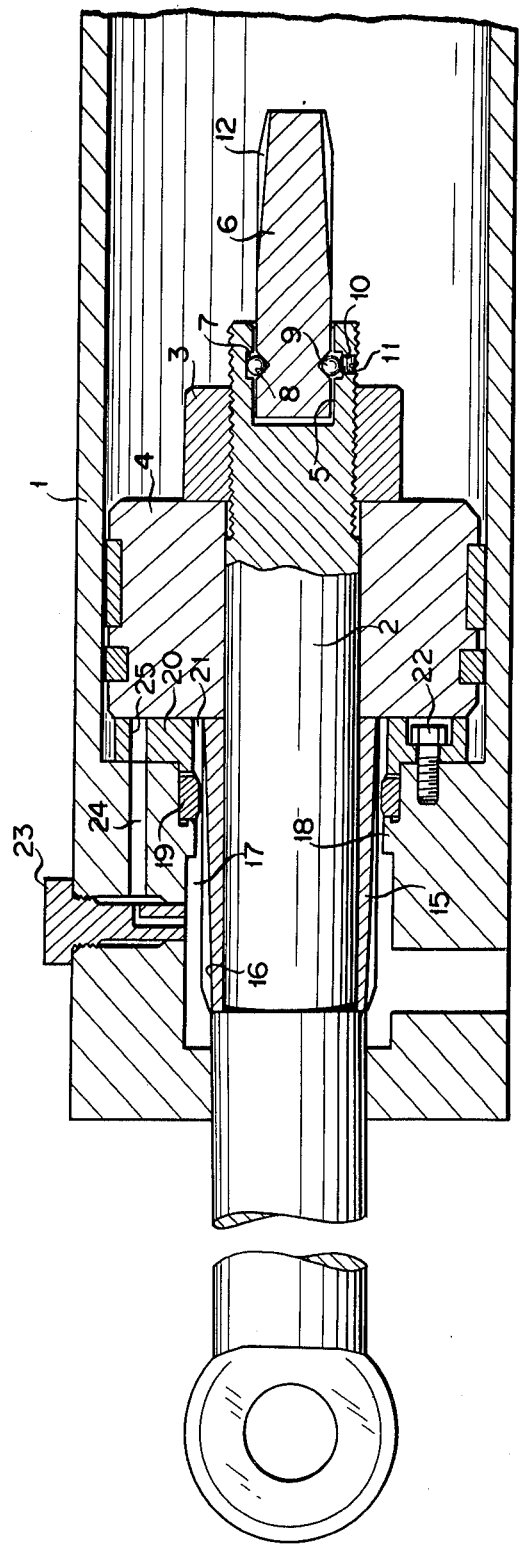
FIG. 1 is a longitudinal cross-sectional view of a stroke cushioning apparatus according to the present invention wherein a piston assembly is moved to the rod-side stroke end.

The present invention will now be described in detail below by way of example only with reference to the accompanying drawings. In FIG. 1, reference numeral 1 denotes a housing or cylinder barrel in which is slidably disposed a piston 4 which is connected to a piston rod 2 by means of a nut 3. The piston rod 2 is formed at its one end with a recess 5 in which the base end or left-hand end of a plunger 6 is loosely fitted. The base end of the plunger 6 has an annular groove 8 having approximately V-shaped section formed in the outer peripheral surface thereof at a location opposite to an annular groove 7 formed in the inner peripheral surface of the recess 5. Accommodated between the annular groove 8 and the annular groove 7 of the recess 5 are a plurality of balls 9. The above-mentioned balls 9 are made, for example, of steel and are arranged to be inserted or taken out through an insertion hole 10 opening to the outer peripheral surface of the piston rod 2 so as to communicate with the annular groove 7. The insertion hole 10 is normally closed by means of a plug 11. The above-mentioned plunger 6 has a plurality of axially extending grooves 12 formed in the outer peripheral surface thereof, each of the grooves 12 being formed to have a depth which increases gradually towards the leading end of the plunger.

The other end of the piston rod 2 extends through the end of the cylinder barrel 1 and projects outside thereof. The piston rod 2 has a sleeve 15 fitted to the outer peripheral surface thereof and on the side of the piston 4 so that one end thereof abuts against the piston. The sleeve 15 has a plurality of axially extending grooves 16 formed in the outer peripheral surface thereof and each having a depth which increases gradually towards the leading end thereof. The leading end of the sleeve 15 is arranged to be introduced in a passage 17 formed in the end of the cylinder barrel 1 when the piston 4 has reached its stroke end on the side of the piston rod. The above-mentioned passage 17 has an inside diameter which is larger than the outside diameter of the sleeve 15, and its one end is opened into the inside of the cylinder barrel 1. Formed in the passage 17 is a land 18 to which a cushion ring 19 is loosely fitted from the inside of the cylinder barrel 1. The cushion ring 19 has an inside diameter which is a little bit larger than the outside diameter of the sleeve 15. The cushion ring 19 has rounded inner peripheral edges and is secured by means of a stop plate 20 which is fixedly secured to the end of the opening of the passage 17 between the land 18 and the stop plate 20.

The above-mentioned stop plate 20 has a hole 21 formed in the central part thereof which is sufficiently larger than the outside diameter of the sleeve 15 and is fixedly secured to the inner end of the cylinder barrel 1 by means of bolts 22. The stop plate 20 has also a hole 25 formed in the part thereof which can be aligned with a passage 24 communicating with a fixed orifice 23. The fixed orifice 23 serves to restrict part of the fluid within the cylinder barrel 1 and allow it to flow into the passage 17.

Figure 2:
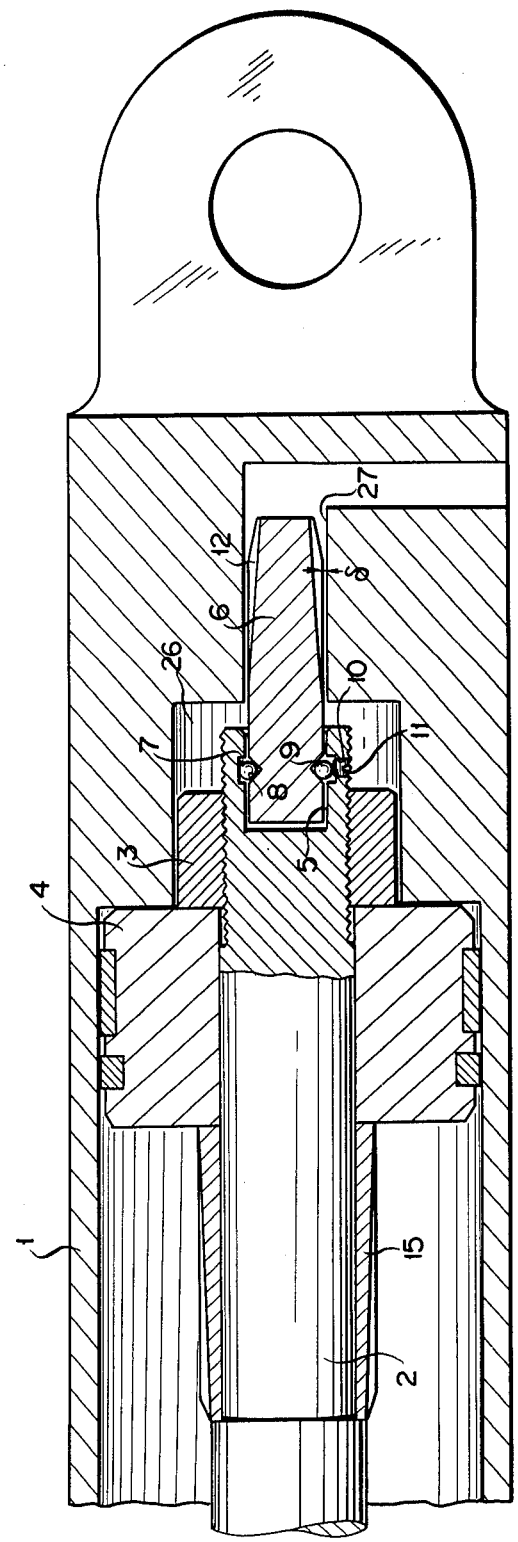
FIG. 2 is a longitudinal cross-sectional view of a stroke cushioning apparatus according to the present invention wherein the piston assembly is moved to the head-side stroke end.

Referring to FIG. 2, there is shown the piston 4 which has been moved to the head end of the cylinder and stopped there. The leading end of the plunger 6 is inserted into a small-diameter passage 27 which extends from a large-diameter passage 26 and is open to the outside of the cylinder barrel 1.

At the stroke end, the plunger 6 is arranged to be inserted into the small-diameter passage 27 with a small clearance δ therebetween.

Thus, when the piston 4 has reached near the rod side stroke end, the leading end of the sleeve 15 is inserted into the passage 17 so that the fluid under pressure on the side of the piston rod being discharged into the passage 17 is restricted suddenly so as to decelerate the piston 4. With the advancement of the sleeve 15 within the passage 17 the sectional area of each of the grooves 16 at the cushion ring 19 is reduced gradually so that the piston 4 is decelerated further and then is stopped when the end face of the piston strikes against the stop plate 20.

Reversely, when the piston 4 has reached the head side stroke end, the leading end of the plunger 6 is inserted into the small-diameter passage 27 and subsequently the nut 3 is introduced into the large-diameter passage 26. As a result, the fluid under pressure which is confined within the large-diameter passage 26 will be throttled or restricted by the plurality of grooves 12 of the plunger 6 and discharged into the small-diameter passage 27 so as to decelerate the movement of the piston 4. With further advancement of the plunger 6 into the small-diameter passage 27, the sectional area of each of the grooves 12 at the inlet portion of the small-diameter passage 27 is reduced so as to increase the piston deceleration effect thereby slowing down the piston 4. The piston 4 is stopped when its end face is allowed to strike against the opposite end face of the cylinder barrel 1.

As described in detail hereinabove, according to the present invention, since the cushion ring is movably disposed as a rod-end stroke cushioning means and is arranged to be held by the stop plate fixedly secured to the inner end face of the cylinder barrel, there is no possibility of generating noise due to partially increased fluid flow and thereby to cause earlier damage of stopper means as in the case of snap rings. Further, if and when a fixed restrictor is provided in combination to allow part of the fluid to pass therethrough, it is possible to adjust finely the deceleration speed of the piston only by replacing the fixed restrictor with ones having different bore sizes.

Still further, as a head-end stroke cushioning means, the base end of the plunger is movably engaged with the leading end of the piston rod through a plurality of balls located in the circumferential groove formed by the recesses in the plunger and the piston rod so that the plunger can be readily fitted to the piston rod with some allowance for movement. Besides, the plunger can be removed readily from the piston rod by taking the balls out so that maintenance of the component parts can be made easily and the structure thereof can be simplified.

It is to be understood that the foregoing description is merely illustrative of a preferred embodiment of the present invention, and that the scope of the invention is not to be limited thereto, but is to be determined by the scope of the appended claims.

What I claim is:

1. A stroke cushioning apparatus for a hydraulic cylinder, comprising:
   a housing;
   a piston assembly slideably mounted within said housing and having a head side stroke end and a rod side stroke end, said piston assembly including a rod and a piston mounted on said rod and defining at least one fluid chamber in said housing;
   a sleeve fixedly mounted on said rod;
   a first axial passage formed in said housing at one end thereof, said first axial passage being communicated with the fluid chamber and outside of said housing and adapted to accommodate said sleeve therein when said piston assembly is moved to its rod side stroke end;
   a land formed in said housing within said first axial passage;
   a stopper plate fixedly mounted to said housing;
   a cushion ring mounted to said housing between said land and said stopper plate, said cushion ring being allowed to move slightly in an axial direction and the inner diameter of which is made larger than the outer diameter of said sleeve;
   a plunger mounted to said rod, a base end of said plunger being inserted in a blind hole formed in said rod at said head end side thereof;
   means for mounting said plunger to said rod with allowing slight movements of said plunger both axially and radially comprising a plurality of balls accomodated in a pair of annular grooves, one formed in each of said plunger and said rod, respectively, and being registered with each other; and
   a second axial passage formed in said housing at the opposite end of said first axial passage, said second axial passage being communicated with the fluid chamber and outside of said housing and adapted to accommodate said plunger therein when said piston assembly is moved to its head side stroke end, the diameter of said second passage being made slightly larger than that of said plunger;

whereby flow of fluid is restricted between said sleeve and said cushion ring when said piston assembly is moved to its rod side stroke end and also flow of fluid is restricted between said plunger and wall of said second passage when said piston assembly is moved to its head side stroke end.

2. A stroke cushioning apparatus for a hydraulic cylinder as recited in claim 1 wherein said sleeve has a plurality of longitudinal first grooves formed therein, cross-sectional area of each of said first grooves being made gradually larger towards opposite end from said piston and wherein said plunger has a plurality of longitudinal second grooves formed therein, cross-sectional area of each of said second grooves being made gradually larger towards leading end thereof.

3. A stroke cushioning apparatus for a hydraulic cylinder as recited in claim 1 further comprising a restrictor formed in said housing at the rod end side thereof for further restricting the flow of fluid thereacross.

* * * * *